April 29, 1952     F. A. BLUHM     2,594,856
FLUID MOTOR
Filed June 17, 1947     2 SHEETS—SHEET 1
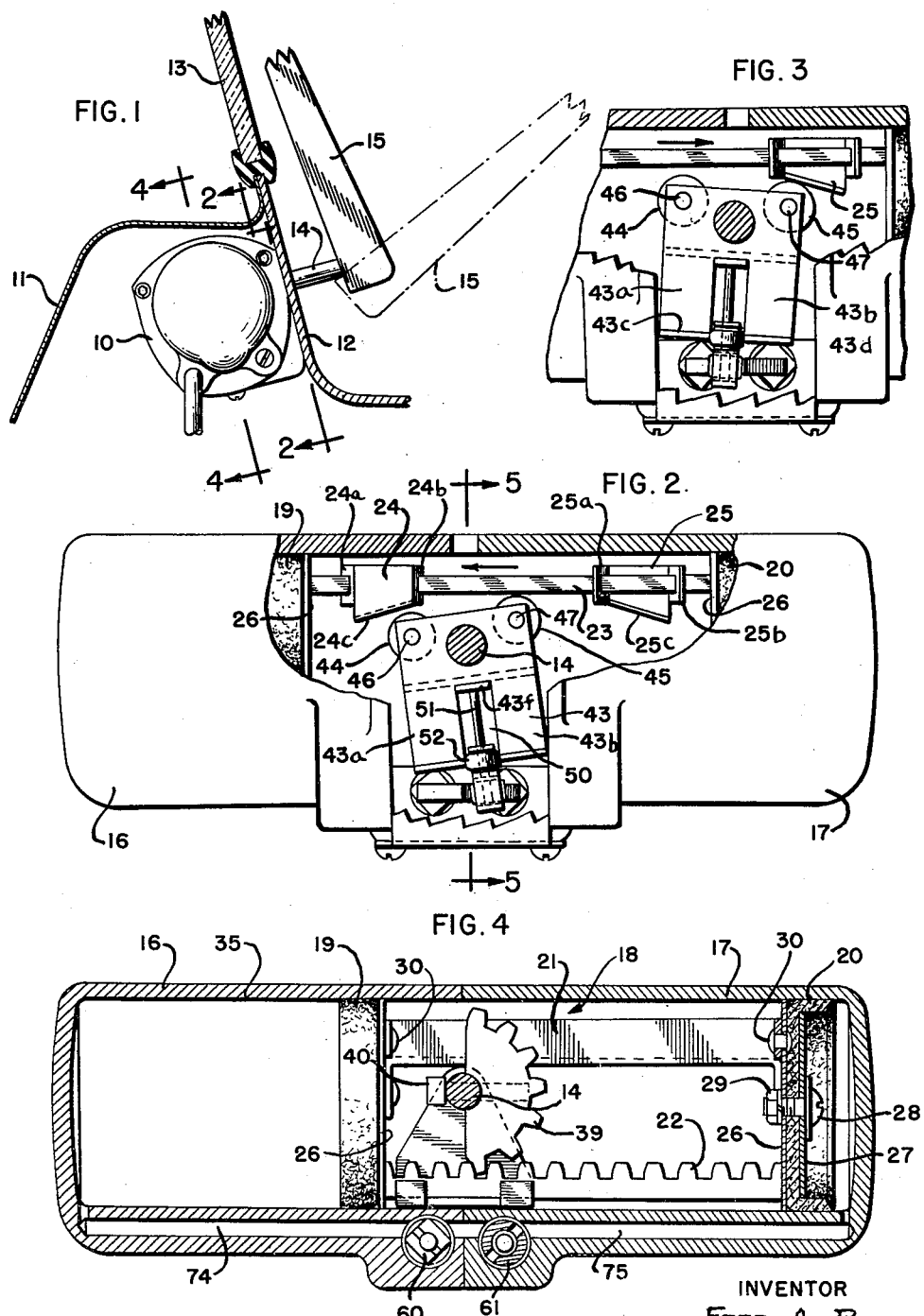
INVENTOR
FRED A. BLUHM
BY Spencer, Marzall,
Johnston & Cook,
ATTORNEYS April 29, 1952  F. A. BLUHM  2,594,856
FLUID MOTOR
Filed June 17, 1947  2 SHEETS—SHEET 2

INVENTOR
FRED A. BLUHM
BY Spencer, Marzall,
Johnston & Cook
ATTORNEYS

Patented Apr. 29, 1952

2,594,856

UNITED STATES PATENT OFFICE 2,594,856

FLUID MOTOR

Fred A. Bluhm, Michigan City, Ind., assignor, by mesne assignments, to Air Appliances Corporation, La Porte, Ind., a corporation of Indiana Application June 17, 1947, Serial No. 755,265

2 Claims. (Cl. 121—164)

This invention relates to fluid-pressure-operated motors of the reciprocatory type and pertains more especially to windshield wiper motors. Specifically, it has to do with a compressed-air-operated windshield wiper motor which is particularly well adapted for use on motor trucks and railway cars where a supply of compressed air is normally available.

One of the primary objects is to provide a windshield wiper wherein the sweep angle of the blade is adjustably variable so as to enable a maximum sweep to be realized, without swinging the blade beyond the windshield surface, irrespective of the locus of the center of rotation of the blade. An ancillary object is to provide means whereby the angular sweep of the blade to each side of vertical posture is independently adjustable and thus variable, so that a maximum sweep can be achieved, without running off the glass, even though the windshield wiper motor is located in a position which precludes equiangular movement of the blade to either side of its vertical posture.

Another object is to provide an improved snap-action valve operating mechanism or valve gear which will function efficiently in co-operation with the blade-sweep adjusting means.

Additional objects and novel features of the invention will be apparent as the ensuing detailed description progresses.

In the drawings which accompany this specification:

Fig. 1 is a transverse section through the cowl, instrument panel and windshield of a motor truck, illustrating a common mode of mounting the windshield wiper motor shown in the succeeding figures;

Fig. 2 is an enlarged view, partly in section and partly in elevation, taken principally at line 2—2 of Fig. 1 and showing a portion of the valve gear, including the piston-operated dogs, for actuating the valves—which dogs are adjustably movable to vary the sweep angle of the wiper arm;

Fig. 3 is a fragmentary view taken at line 2—2 of Fig. 1 and illustrating, in conjunction with Fig. 2, the mode of operation of the valve-actuating dogs;

Fig. 4 is a longitudinal sectional view taken at line 4—4 of Fig. 1—showing especially the piston assembly and the rack and segment drive interconnecting the piston assembly with the wiper shaft;

Figure 5:
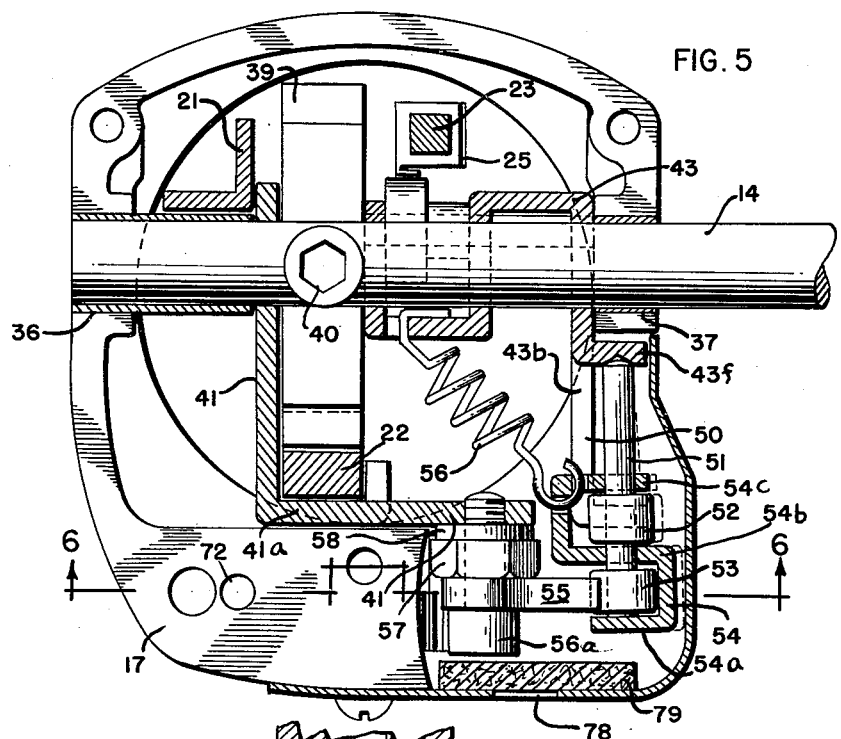
Fig. 5 is an enlarged section taken at line 5—5 of Fig. 2.

In Fig. 1 the motor 10 is shown located underneath the instrument panel 11 and attached to the sheet metal cowl 12 of a motor truck—above which is mounted the windshield 13. The wiper shaft 14 is shown projecting through the cowl to the outside of the truck body, and attached to said shaft is a wiper arm 15. This arm is shown full-line in its normal working position and in dot-dash outline in its outwardly extended position.

The motor 10 comprises two cast metal cylinder blocks 16 and 17, bolted together end-to-end and bored to provide a cylindrical chamber 35 in which is slidably mounted a piston assembly 18 comprising two opposed pistons 19 and 20, spaced apart axially and interconnected through the medium of a spacer bar 21 of angular cross-section, and a rack 22, which latter also serves as a spacer between pistons 19 and 20. Also bridged between the two pistons is a bar 23 of square cross-section, on which are mounted two dogs 24 and 25. Each piston, 19 and 20, is composed of a leather cup or the like gripped between two metal discs 26 and 27 by means of a bolt 28 and nut 29. The spacer bar 21 is secured at its two ends to discs 26 by means of rivets 30. Rack 22 is secured to said disc 26 in any suitable manner, as is also the bar 23. It will be apparent that the piston assembly 18 is bodily reciprocable in the cylinder 35—being shown in Fig. 4 at one extremity of its travel.

The previously referred to wiper shaft 14 extends transversely through the body of the motor and is journaled in two self-lubricated bushings 36 and 37 (see Fig. 5) which are clamped between the two cylinder blocks 16 and 17. Said shaft extends outwardly at one end for connection to the wiper arm 15, as shown in Fig. 1.

A gear segment 39 is mounted on and rotatable with shaft 14 and secured thereto by means of an Allen-head screw 40. Segment 39 is meshed with rack 22 and is adapted to oscillate shaft 14, rotationally, through an angle of 180 degrees in response to each full stroke of rack 22—the reciprocatory movements of which are, of course, coincident with those of piston assembly 18, of which the rack is a component part.

In order to keep rack 22 correctly meshed with segment 39, it is necessary to prevent rotation of the piston assembly 18 about its longitudinal axis, and to that end there is suspended from shaft 14, at one side of segment 39, a member 41 which is bored to fit said shaft and bent to form a U-shaped guide 41a in which rack 22 is slidable lengthwise. It will be seen that rack 22 is restrained against lateral displacement in either direction by virtue of said U-shaped guide and is thus held in proper working alignment with segment 39.

Also mounted on shaft 14, but not secured thereto, is a rocker 43, the upper part of which is of zig-zag formation, as shown in Fig. 5. Said rocker carries a pair of rollers 44, 45, which are rotatably mounted on pins 46, 47, and said rollers are positioned to be engaged individually by two dogs 24, 25. Said dogs are identical and are made, preferably, of spring-tempered sheet steel and are mounted on bar 23 which, as shown in Fig. 5, is of square cross-section. Each dog has two wings 24a, 24b and 25a, 25b which are bent to lie at a suitable angle to bar 23 and provide each with a square opening to accomodate said bar. The dogs are each slidable along bar 23 but are grippingly adhered thereto by virtue of the fact that the aforementioned wings are spring-biased to press against opposite sides of the bar. The pressure thus exerted is adequate normally to retain the dogs in any positions to which they may be set along bar 23, but not sufficient to prevent their being forcibly moved by means of a suitable tool such as a screwdriver long enough to reach the dogs through an opening in the top of the motor. Each dog 24, 25 has an inclined surface 24c, 25c which is operative to engage and ride over the top of its associated roller 44 or 45, and in so doing is effective to depress its associated roller and thus cause rocker 43 to rotate through a small angle about the center of shaft 14. Rocker 43 has a vertical dead-center position and when pushed over dead center in either direction will continue its movement to a certain extent, for reasons which will hereinafter be made clear. In Fig. 2 the piston assembly, including dogs 24 and 25, is assumed to be moving leftward, as indicated by the arrow adjacent bar 23. Hence, dog 25 is approaching roller 45 and will presently engage the same, as shown in Fig. 3, and thus cause rocker 43 to be rotated clockwise to the position in which it is shown in the latter figure. This clockwise rotation of rocker 43 effects an operation of the hereinafter described motor control valves, which results in an immediate reversal of the direction of movement of the piston assembly, upon the completion of which dog 24 will engage roller 44 and bring about a counterclockwise rotation of the rocker to the position in which it is shown in Fig. 2—thus again operating the motor control valves to again reverse the direction of movement of the piston assembly. The reciprocatory movements of the piston assembly and coincident oscillation of rocker 43 goes on continuously as long as compressed air or other fluid-under-pressure is supplied to the motor; and wiper shaft 14 is continuously oscillated by the piston assembly through a sweep angle which is determined by the positions of dogs 24 and 25 on bar 23. The greater the separation between the two dogs the longer will be the stroke of the piston assembly and, consequently, the greater will be the sweep angle. Conversely, the less the separation between the dogs the smaller will be the sweep angle. Not only is the magnitude of the sweep angle, as a whole, rendered variable by the movability of dogs 24 and 25, but the two angles of sweep to either side of the vertical plane through the center of the wiper shaft are independently variable. This follows from the fact that the two dogs are individually movable along bar 23. Thus, for example, if the conditions of installation were such as to render it desirable to sweep through an angle of, say, thirty degrees to one side of the vertical plane and eighty degrees to the other side of the vertical plane, this could readily be done by setting the respective dogs at proportionate distances from the mid-point of bar 23.

Rocker 43 has two parallel downwardly extending legs 43a and 43b, which are bent at their lower ends to form horizontal, laterally spaced arms 43c and 43d; and at the upper end of the slot 50, constituting the space between said legs 43a and 43b and between said arms 43c and 43d, is an additional horizontal arm 43f which also is an integral part of rocker 43.

Arm 43f is recessed on its lower surface to form a seat for the upper pointed end of a vertical shaft 51 to which are secured two small rollers 52 and 53—see Fig. 5. Said shaft 51 carries an S-shaped member 54, the lower leg 54a of which is recessed to pivotally support the lower end of the shaft. The other two horizontal legs 54b and 54c are each bored to fit shaft 51—the latter being rotatable in said bores.

Roller 52 is a sliding fit in slot 50 and is movable, together with roller 53, shaft 51 and S-shaped member 54 in the plane of the drawing, as viewed in Fig. 5, about the upper end of shaft 51 as a pivotal center. The assemblage comprising shaft 51, rollers 52 and 53 and member 54 is also movable in the plane perpendicular to the drawing, as viewed in Fig. 5, with rocker 43; but is not movable in that plane relatively to rocker 43 because roller 52 is a close running fit in slot 50.

Roller 53 is continuously in contact with one or the other of two convergent, angularly disposed surfaces 55a and 55b of a valve actuator 55—said surfaces meeting at the apex 55c—and is held in pressing engagement with said valve actuator by a helical tension spring 56, one end of which is anchored to rocker 43 while the other end is anchored to S-shaped member 54. Spring 56 lies at a suitable angle so that it pulls upwardly on the assemblage comprising shaft 51, rollers 52, 53 and S-shaped member 54, thus holding the upper end of shaft 51 in firm contact with its seat in arm 43f; and at the same time said spring urges the lower end of the aforementioned assemblage toward valve actuator 55 whereby to maintain a suitable contact pressure between roller 53 and said valve actuator.

Valve actuator 55 is pivotally mounted on a bolt 56a which is threaded into a horizontal arm 41a constituting an integral part of member 41. Bolt 56a is secured against loosening by a locknut 57 and lockwasher 58.

Two identical poppet type valves 60 and 61 are provided for controlling admission and release of compressed air into and from the two ends of the cylindrical chamber, alternately, in response to actuating movements of valve actuator 55 which, in turn, is oscillated about its pivotal center in conformity with the oscillatory movements of rocker 43, effected in the manner previously described.

Each of the two valves comprises a body 62 which is threaded into one of the two cylinder block castings 16, 17, an annular valve seat 63, and a valve pin 64 having a head 65 which is provided with a beveled surface adapted to make airtight contact with the valve seat.

Figure 6:
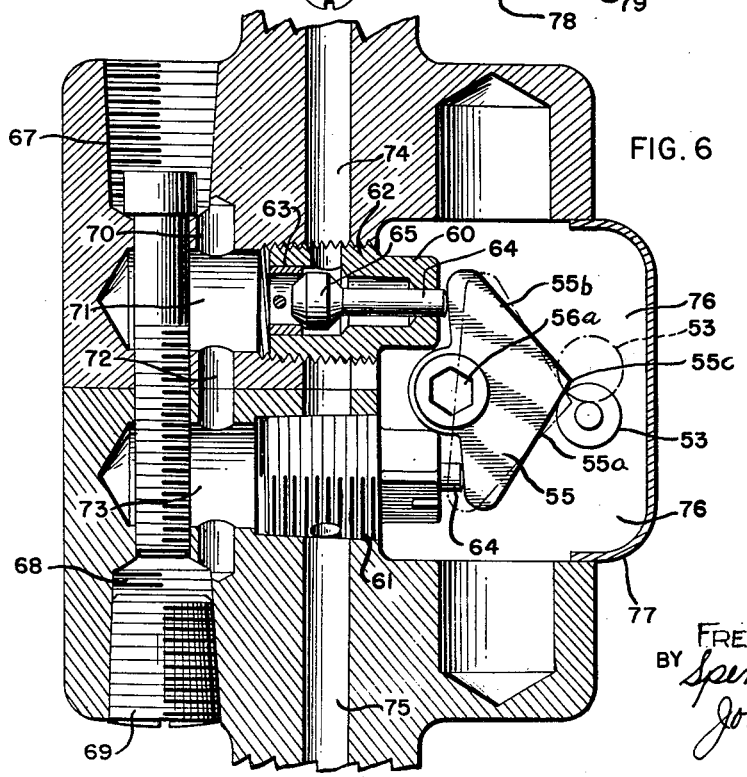
Fig. 6 is an enlarged section taken at line 6—6 of Fig. 5.

Compressed air is admitted to the motor through one or the other of two pipe-threaded intake openings 67 or 68—the opening not in use being closed by a pipe plug 69. The incoming air proceeds, as indicated by arrows in Fig. 6, through suitable passageways 70, 71, 72 and 73 to the intake ends of both valves. In Fig. 6, the valve 60 is closed by reason of the fact that valve actuator 55 is holding valve pin 64 depressed; but when that valve is open, air will flow therethrough and thence via passageway 74 into one end of the cylindrical chamber. While valve 60 is closed, as shown in Fig. 6, valve 61 is open and air flows into the associated end of the piston chamber via passageways 70—73 and thence through valve 61 and passageway 75. When either valve is closed the compressed air previously admitted to the associated piston chamber is discharged via the passageway 74 or 75, as the case may be, and thence through the clearance between valve pin 64 and the body 62 into an expansion chamber 76 which is formed in part by the two cylinder block castings 16, 17 and, in part, by a sheet metal cover 77. The expanded air escapes from chamber 76 through a discharge opening 78 which is covered by a porous felt pad 79. Chamber 76 functions as a muffler or noise suppressor to reduce the hissing sound of the air discharge.

In Fig. 6 the valve actuator 55 is shown in full lines in one of its two alternate extreme positions wherein it is effective to depress valve pin 64—thus holding valve 60 closed against the pressure of the air supply. This position of the valve actuator is maintained by reason of the fact that roller 53 is pressing against the inclined surface 55a, which pressure engenders a component of force acting on the valve actuator and tending to rotate the same in the counterclockwise direction as viewed in Fig. 6. At the same time valve 61 is open—its valve pin being released—and, as a result, the piston assembly is moving to the left, as viewed in Fig. 4. When, at the end of the instant stroke, dog 25 engages roller 45 and thus causes rocker 43 to be rotated to the position in which it is shown in Fig. 3, the roller 53 (see Fig. 6) will be moved past apex 55c to the position in which it is shown in dot-dash outline. During the movement of roller 53 toward the apex 55c the valve actuator 55 remains in the same position in which it is shown in full lines, and valve 60 remains closed while valve 61 remains open. But as soon as roller 53 passes over apex 55c its pressure is brought to bear against the inclined surface 55b and thereupon the rotational component of force exerted by roller 53 upon actuator 55 is reversed and the latter is abruptly rotated in the clockwise direction to the position in which it is shown in dot-dash outline in Fig. 6. This results in an abrupt opening of valve 60 and a concurrent abrupt closing of valve 61, thus causing an immediate reversal of the direction of movement of piston assembly 18 and a corresponding reversal of the wiper arm.

Wherever the term "valve control gear" is referred to in the appended claims, that term includes the entire above described mechanism functioning to actuate the valves in timed relation with the reciprocatory movements of the piston assembly, being the terminology usually applied in allied arts to mechanism of similar function.

Although the foregoing description deals with only one embodiment of the invention, it is to be understood that this is by way of example only and not by way of limitation, since there obviously are many possible modifications and alternatives within the purview of the broad inventive concept and, accordingly, it is desired that the invention not be regarded as limited in scope otherwise than as indicated by the terms of the appended claims.

What is claimed is:

1. In a fluid motor, a piston assembly comprising two axially spaced pistons, a cylinder block having a cylindrical bore in which said piston assembly is reciprocable, a shaft extending transversely of said cylinder block and operatively connected with said piston assembly whereby said shaft is reciprocable rotationally in response to reciprocation of said piston assembly, a bar interconnecting said pistons and extending parallel to the axis of said cylindrical bore, a pair of dogs secured to said bar in spaced relation lengthwise thereof, the positions of said dogs lengthwise of said bar being individually adjustable manually, a pair of poppet valves operative individually to admit fluid-under-pressure into said cylinder bore at opposite ends of said piston assembly, respectively, each of said valves being operative, when closed, to release the pressure in its associated end of said cylinder bore, and valve control gear for operating said valves alternately in timed relation with the reciprocatory movements of said piston assembly whereby automatically to reverse the direction of movement of said piston assembly each time the latter reaches either end of a predetermined stroke, said valve control gear including a rocker and valve actuator, said rocker having a pivotal center about which it is reciprocable rotationally, said dogs being operative to engage said rocker alternately to tilt the same in opposite directions about its pivotal center, said valve actuator being pivotally mounted and operative to actuate said valves alternately in response to arcuate movements thereof in opposite directions, said valve actuator having two convergent surfaces meeting at an apex, and means carried by said rocker for operating said valve actuator, said means including a roller which is spring-pressed against said actuator and which is movable by and with said rocker in such manner that it rolls along said convergent surfaces and across said apex each time said rocker is tilted by one of said dogs, the pressure of said roller against said actuator being so directed that when said roller traverses said apex and thus passes from one of said convergent surfaces to the other, said actuator is rotated about its pivotal center, abruptly, from one extreme position to another.

2. In a fluid pressure motor having a body defining a cylindrical chamber and a piston reciprocable in said chamber, a first poppet valve operable to control the admission of fluid under pressure into one end of said chamber for propelling said piston in one direction, a second poppet valve operable to control admission of fluid under pressure into the other end of said chamber for propelling said piston in the opposite direction, a shaft journaled in said body, a gear segment fixedly mounted on said shaft, a rack gear carried by said piston and meshing with said gear segment whereby oscillating movement is imparted to said shaft when said piston is reciprocated in said chamber, a rocker member pivoted on said shaft, a pair of rollers carried by said rocker member, means carried by said piston and adapted to contact said rollers alternately, whenever the piston reaches a predetermined limiting position at either end of its stroke, whereby intermittent rocking movement is imparted to said rocker member, roller means carried by said rocker member, and a valve actuator arcuately reciprocable in a plane substantially parallel to said shaft and adapted to contact said valves, said valve actuator having a pair of angularly converging surfaces which meet at an apex, said roller means being adapted to roll from one of said converging surfaces to the other of said surfaces by way of said apex whereby an intermittent snap action is imparted to said valve actuator so as to abruptly and alternately actuate each of said valves whereby the piston may be reciprocated.

FRED A. BLUHM.

REFERENCES CITED

The following references are of record in the file of this patent:

UNITED STATES PATENTS

| Number | Name | Date |
|---|---|---|
| 270,576 | Blakeslee | Jan. 16, 1883 |
| 884,200 | Obernesser | Apr. 7, 1908 |
| 958,492 | Hardy | May 17, 1910 |
| 1,873,907 | Romano | Aug. 23, 1932 |
| 2,290,937 | Benner | July 28, 1942 |
| 2,303,872 | Willows | Dec. 1, 1942 |
| 2,346,502 | O'Shei | Apr. 11, 1944 |
| 2,354,189 | Bell | July 25, 1944 |
| 2,376,009 | Sacchini et al. | May 15, 1945 |
| 2,391,996 | Muller | Jan. 1, 1946 |
| 2,415,607 | Sacchini | Feb. 11, 1947 |

FOREIGN PATENTS

| Number | Country | Date |
|---|---|---|
| 167,870 | Germany | Mar. 3, 1906 |